United States Patent [19]

Kim

[11] Patent Number: 5,198,916
[45] Date of Patent: Mar. 30, 1993

[54] OPTICAL PICKUP

[75] Inventor: Chun-dong Kim, Kyunggi-do, Rep. of Korea

[73] Assignee: Samsung Electronics Co., Ltd., Suwon, Rep. of Korea

[21] Appl. No.: 826,112

[22] Filed: Jan. 27, 1992

[30] Foreign Application Priority Data

May 13, 1991 [KR] Rep. of Korea .................. 91-7716

[51] Int. Cl.$^5$ .......................... G02B 5/32; G02B 3/02; G11B 7/00
[52] U.S. Cl. .................................... 359/15; 359/566; 359/728; 369/44.23
[58] Field of Search ................. 250/201.5; 359/15, 22, 359/25, 566, 572, 708, 728, 729; 369/44.21, 44.23

[56] References Cited

U.S. PATENT DOCUMENTS

| | | | |
|---|---|---|---|
| 4,689,479 | 8/1987 | Tatsuno et al. | 250/201.5 |
| 4,868,803 | 9/1989 | Sunagawa et al. | 369/44.23 |
| 4,885,732 | 12/1989 | Sunagawa et al. | 369/44.23 |
| 4,929,823 | 5/1990 | Kato et al. | 369/44.23 |
| 4,945,527 | 7/1990 | Sunagawa | 369/44.21 |
| 5,111,448 | 5/1992 | Komma et al. | 369/44.23 |

FOREIGN PATENT DOCUMENTS

| | | | |
|---|---|---|---|
| 59-231738 | 12/1984 | Japan | 369/44.23 |
| 61-216138 | 9/1986 | Japan | 369/44.23 |

*Primary Examiner*—Martin Lerner
*Attorney, Agent, or Firm*—Robert E. Bushnell

[57] ABSTRACT

An optical pickup, installed in an optical or magneto-optical disc driver, for reproducing/recording optical information is disclosed. The optical pickup is of a subminiature united body type and very light weight, high speed seek, and is composed of an optical system including a hologram lens element. The hologram of the lens element is formed of a predetermined pattern which diffracts a spherical wave and focuses reflected light from the disc onto a detector offset from the light source. This optical pickup can reproduce optical information having no interference and detect focus and track errors without an optical element separating the incident light and reflected light by a hologram pattern. Accordingly, a very light, subminiature optical pickup composed of an optical system having one lens element is provided.

8 Claims, 4 Drawing Sheets

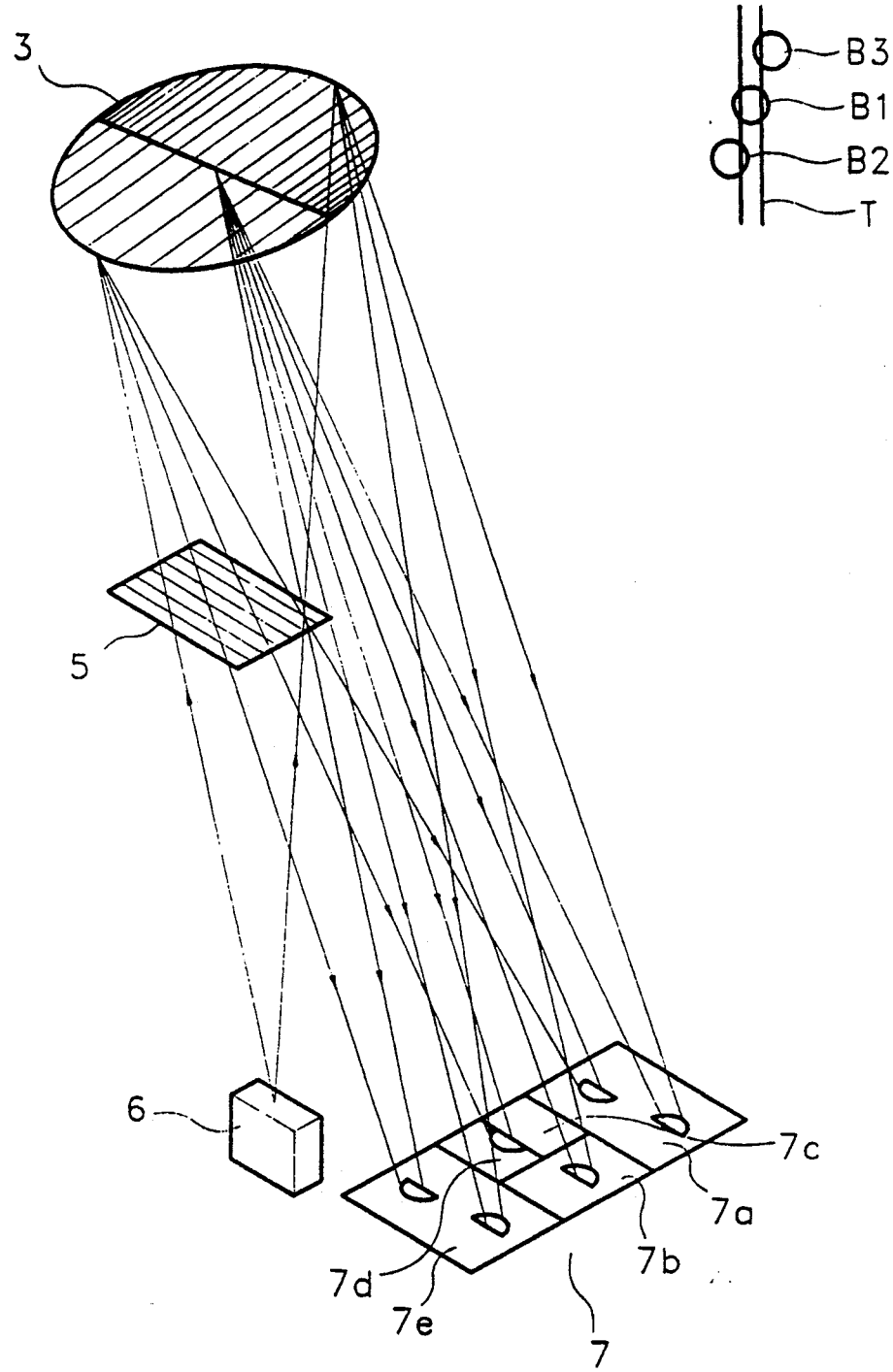

FIG.5A  FIG.5B  FIG.5C
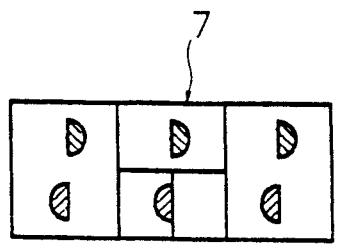 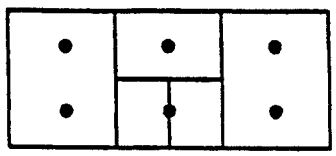 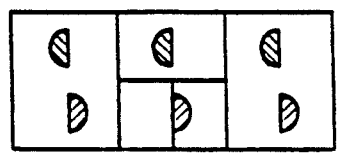
FIG.6
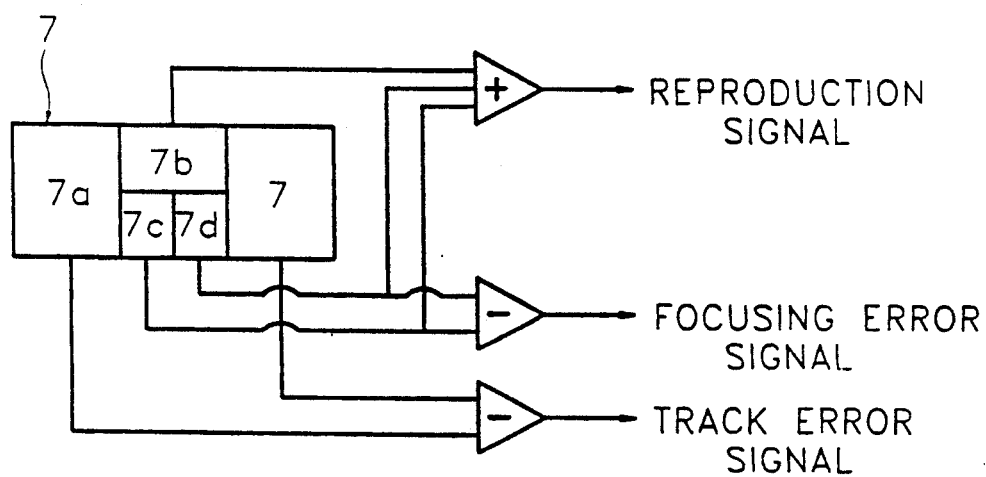

OPTICAL PICKUP

BACKGROUND OF THE INVENTION

The present invention relates to an optical pickup installed in an optical disc driver, a magneto-optical disc driver, etc., for reproducing/recording optical information, and more particularly to an optical pickup constituting a subminiature and very light optical system using an aspherical single lens and a hologram.

In current systems for reproducing/recording optical information, there are several disc devices which are constructed in such a way that a disc-shaped optical information medium or a magneto-optical disc is rotated at a certain linear velocity and an optical pickup is provided to focus and scan light beams on the disc.

In these disc devices, an optical pickup is mounted with a delivery apparatus to be reciprocated along a radius or a circle within the radius range of the disc so as to scan light beams to the desired position on a disc. The optical pickup is also mounted jointly with an actuator to control all of an optical system or part of an optical system, including an object lens to the vertical and horizontal directions, for servo control of the light beam's exact focusing position within an accesses track, i.e., the focusing/tracking servo. Accordingly, when the optical pickup is manufactured, in order to achieve high accessing speed and a high degree of focusing and tracking control, the weight of the operative parts positioned by the delivery apparatus or an actuator should be reduced as much as possible.

The scope of optical pickups includes united optical pickups whose operative elements control the whole optical system, and separated optical pickups which control only parts of the optical system. An advantage of the united optical pickup is in the focusing/tracking servo because the optical axis of light source always equals that of the objective lens, however, the access time suffers due to its overall control of the system. Thus, in disc devices requiring high speed access, e.g., a magneto-optical disc device, separated optical pickups are typically used. However, since in the separated optical system the optical axis of the light source does not always equal that of the objective lens due to the focusing position of the light beam, errors are frequently generated in focusing error and tracking error detection. Moreover, control system of the separated optical pickup uses complicated logic to compensate for errors which result from severe influence due to disc vibration. Accordingly, high speed access and accurate servo operation is preferred so that the pickup can be moved fast.

However, the conventional optical pickup is composed of a series of lens groups for forming a parallel beam out of the diverging light from a light source, focusing and scanning it on the disc, and separating the light reflected from the disc from the incident light to ultimately be focused on a photodetector, creating limitations in size and weight. Moreover, conventional manufacturing is very difficult, because high accuracy is required, i.e., in units of micrometers.

Meanwhile, as a relatively simple structure, a pickup can be constructed by applying a hologram having an interference pattern of holography light as an object lens (or holo-lens). This uses the property wherein a spherical wave focused at one point from a reference light is diffracted by a function of the change in the wave surface of the hologram. But, when a parallel beam is maintained, moving only the holo-lens according to the up and down movement of the disc, the effective numerical aperture (NA) value is smaller. However, it is very difficult to converge the parallel beam, which complicates the constitution of the optical system except the holo-lens.

SUMMARY OF THE INVENTION

It is an object of the present invention to provide a very light, subminiature optical pickup which is very simple because the incident light from a light source to a disc and the reflected light returning from the disc pass through a single lens, which can perform high speed seeking as a united body.

This object can be achieved by applying a hologram lens that is different from the conventional holo-lens in that the hologram is directly formed on the focusing lens, and by actively using the principle where spreading light irradiates a hologram, and is focused at a position slightly offset from the light source focal point.

To achieve the object of the present invention, an optical pickup includes:

an aspherical single lens as a light focusing medium formed with a hologram reflective surface disposed on a center of a medium surface and having a predetermined hologram pattern for reflecting an incident light toward an opposite medium surface and, at the same time, focusing onto points beside the source focal point, a diffracted spherical wave from the reflected light reflected in an optical information medium;

a reflective mirror for partially scanning a light reflected from the hologram reflective surface of the aspherical single lens via the aspherical single lens into the medium and, at the same time, reflecting the reflected light;

a light source for providing the incident light with respect to the hologram reflective surface of the aspherical single lens; and a photodetector for detecting a light bounced off the hologram reflective surface of the aspherical single lens, thereby performing a reproducing/recording operation of optical information.

In the present invention having the above constitution, the actual separation of an incident light and an reflected light is carried out in the hologram reflective surface of the aspherical single lens, so that mutual interference is not generated. Accordingly, the conventional optical element separating the incident light and reflected light is unnecessary, thereby providing a subminiature and very light optical pickup.

In the implementation of the present invention, a three beam method detects vertical and horizontal information from the light focused by the aspherical single lens. For example, the fundamental beam, positive and negative diffraction beams of the first order, second order, etc., are generated by disposing a diffraction rating in the front of the light source. Then, using the fundamental beam and positive and negative first order beams, the detection of the position of the focused light with respect to a medium is possible. Also, using peripheral light irradiated onto the aspherical single lens and surrounding the diffraction grating, produces a signal for compensating for errors due to varied slopes or the vibration of the medium. Specifically, the pickup of the present invention has an advantage of reducing the manufacturing process and being capable of mass-production due to the packaging of the above-mentioned elements.

BRIEF DESCRIPTION OF THE DRAWINGS

The above object and other advantages of the present invention will become more apparent by describing the preferred embodiments of the present invention with reference to the attached drawings, in which:

FIG. 3 is a beam path view for explaining the light detection principle of the three beam method according to the embodiments of the present invention;

FIG. 4 is a beam path view for explaining the operation principle of hologram according to the embodiments of the present invention;

FIGS. 5A-5C show photodetector states according to the embodiments of the present invention;

FIG. 6 shows an error detection circuit according to the embodiments of the present invention;

DETAILED DESCRIPTION OF THE INVENTION

Hereinafter, a preferred embodiment of the present invention will be described with reference to the accompanying drawings.

Figure 1:
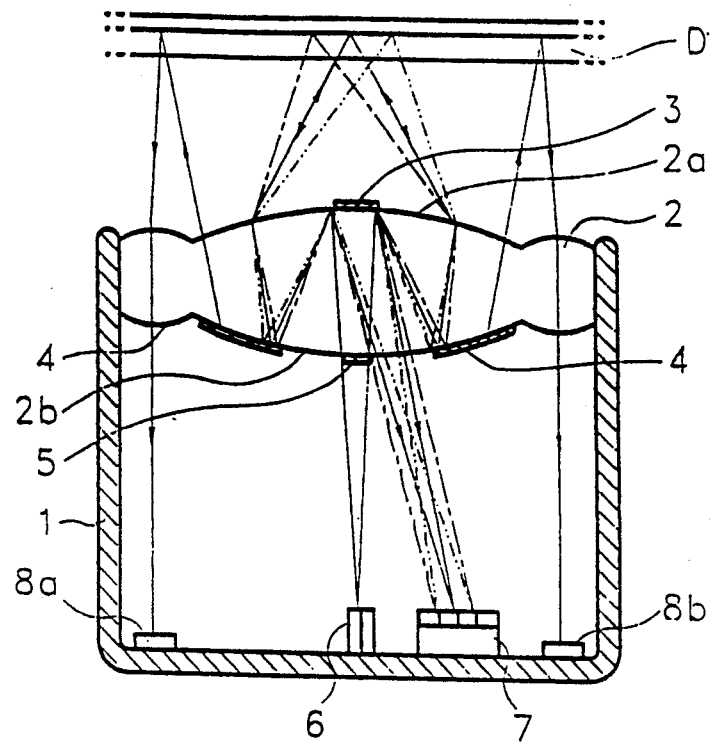
FIG. 1 is a cross-sectional view of a first embodiment of an optical pickup according to the present invention.

FIG. 1 is a cross-sectional vie of an optical pickup according to a first embodiment of the present invention.

In this drawing, an aspherical single lens 2 is attached at the inner side of an opening on an upper part of a cup-shaped case 1. Further, a hologram reflective surface 3 is formed on a first medium surface 2a opposed to a disc D of the aspherical single lens 2, while a ring-shaped reflective mirror 4 and a grating 5 are attached to a second medium surface 2b. Additionally, a laser diode 6 as a light source, a photodetector 7, and a plurality of photosensors 8a and 8b are disposed in the bottom of the case 1.

Here, a laser beam radiated from the laser diode 6 passes the diffraction grating 5 and changes its optical path to the first medium surface 2a by a hologram reflective surface 3, where the beam is directed toward the second medium surface 2b. Then, the emitted laser beam is deflected again back toward first medium surface 2a by the reflective mirror 4 to be focused on a disc D by the medium. Accordingly, the aspherical single lens 2 of the present invention has the NA value of 0.45 to 0.6 required on the disc D by the diffusion of the light in the reflective mirror 3. The beam reflected from the disc D again reaches the hologram reflective surface 3 by way of reflective mirror 4. Then the hologram pattern of the hologram reflective surface 3 (refer to FIG. 4) focuses the reflected light on designated areas of the photodetector 7 which is to the side of the point light source, i.e., laser diode 6. Diffraction grating 5 splits the incident light into a fundamental beam, positive and negative diffraction beams, of the first order, second order, etc., to focus a fundamental beam B1 and the first order subbeams B2 and B3 onto a track T (refer to FIG. 3). As will be discussed later, this is to read out information recorded on the disc using the fundamental beam B1 which at the same time, detects a focusing error of the beam's focal point within a track, while subbeams B2 and B3 detect the beam's track error. Also, during the detection of the beam's focus and track error, the photosensors 8a and 8b are to compensate for variations in the error detection due to disc vibration and/or tilt. This is accomplished using the light deviated from the part excepting the Gaussian beam distribution region of the laser diode 6, i.e., the grating 5, which will also be described later.

Figure 2:
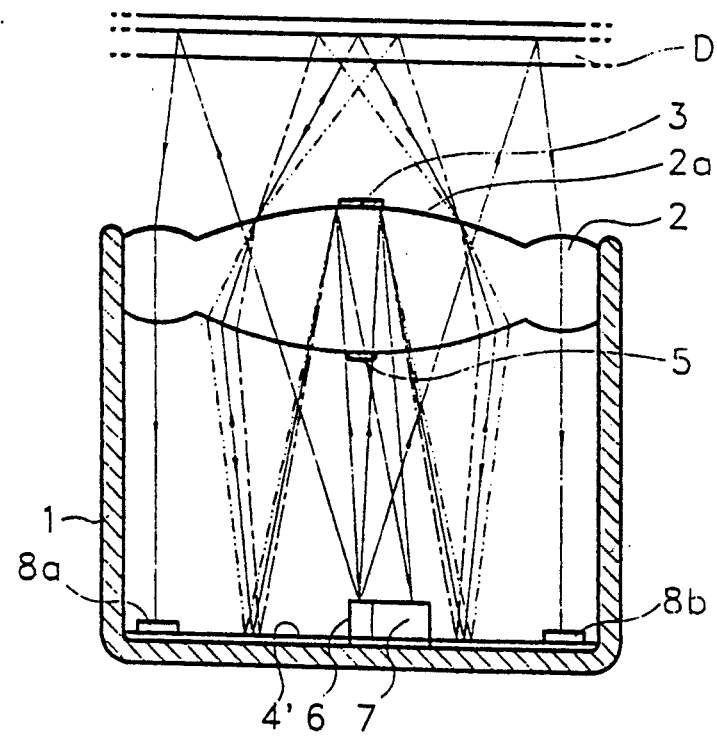
FIG. 2 is a cross-sectional view of a second embodiment of an optical pickup according to the present invention.

FIG. 2 is a second embodiment of the present invention. Contrary to FIG. 1, this embodiment sufficiently extends the optical paths of the incident light and the reflected light by directly forming the reflective mirror 4' on the whole bottom surface of case 1. Except for this change in the mirror's position, all parts are identical to those of FIG. 1.

FIG. 3 shows the condition of a beam focused on one track of the disc D in the aforementioned embodiments of the present invention. The fundamental beam B1 irradiates to the center of the track T. In turn, the modulated beam is reflected from the track containing that track's optical information and focal point position. The subbeams B2 and B3 provide the fundamental beam's track error information as a difference between reflected light densities. As shown in FIGS. 1 and 2, the reflected fundamental beam and subbeams bounce off the reflective mirror 4 or 4', thereby establishing paths back to the hologram reflective surface 3. A spherical wave diffracted by the hologram pattern emanates from the hologram reflective surface 3, reaching the photodetector 7 offset from the laser diode 6 and very near its originating focal point. Accordingly, the hologram pattern and the detecting regions on the photodetector 7 are disposed under specific conditions, thereby individually detecting a reproducing signal, focus and track error signals, etc. from the modulated light of fundamental beam B1 and the subbeams B2 and B3.

According to FIG. 4, the hologram pattern is within the region of divergence light emitted by laser diode 6 and then passed through the grating. The region forms a circle and is composed of two semicircular regions with latticelike patterns having different pitches formed on each region. By this, each pair of focused points of the zero order main beam B1 and the ± first order sub-beams B2 and B3 are formed by each diffraction characteristic of the two different patterns. Accordingly, in this case, the photodetector 7 have five detecting regions 7a through 7e, whose detected states are as shown in FIGS. 5A-5C according to the vertical position of the disc D with respect to the incident light. FIG. 5A shows that the disc D is too close; FIG. 5B shows that the disc D is at the focus; and FIG. 5C shows that disc D is too far.

In such a photodetector 7, as shown in FIG. 6, the reproduced optical information recorded on disc D is the signal obtained from the sum of the light densities of the diffracted fundamental light beams incident to central detecting regions 7b, 7c, and 7d. The focusing error signal is obtained from the difference between those beams striking the two detecting regions 7c and 7d. The tracking error signal is obtained from the difference between light densities of the diffracted positive and negative first order light beams reaching on the left and right detecting regions 7a and 7e.

Figure 7:
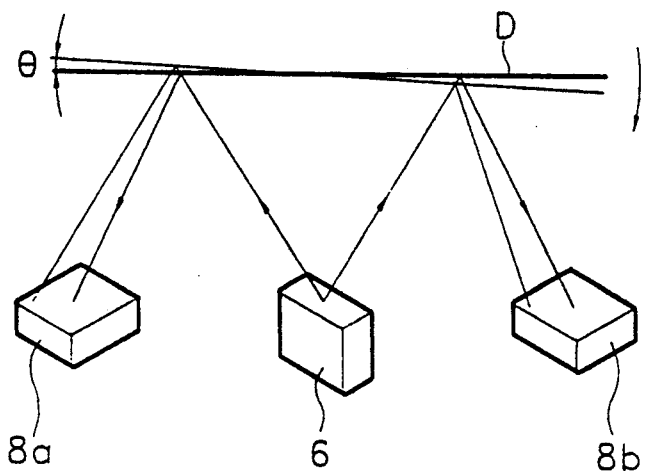
FIG. 7 is an optical system diagram showing the detection of the disc slope according to the embodiments of the present invention.

FIG. 7 shows the basic elements of an optical system which compensate for variations in the focus and track error signal detection when the disc's surface is tilted due to vibration. At rest (the solid line), the divergence angle of the light reflected from the disc D to the photosensor 8a equals that of photosensor 8b, thereby equal light density is detected by both photosensors. When tilted to an angle θ (the image line), a difference exists between the respective light densities detected in photosensors 8a and 8b. Accordingly, variations in the track error detection due to vibration can be compensated by a differential signal of the two photosensors 8a and 8b. Although not shown, compensation for inconsistencies in the track error detection due to varied slopes in the radial and tangential directions is possible by disposing four photosensors at 90° intervals. Also, a similar method compensates for variations in the focus error detection due to vertical disc vibration by the use of detected light density from at least one photosensor, or, when a plurality of photosensors are installed, the total sum of all detected light densities.

Figure 8A:
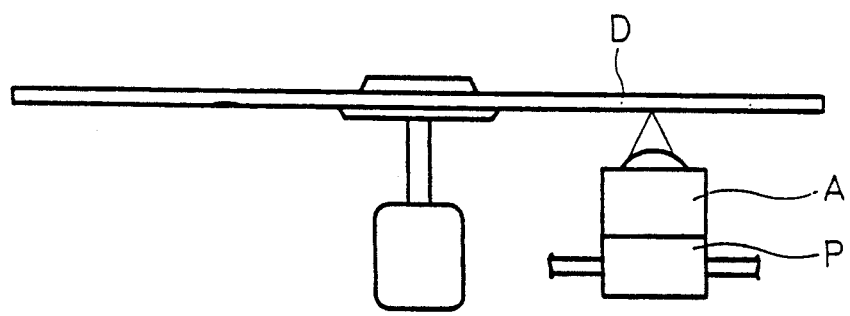
FIG. 8A is a side view showing an example of the installation of the conventional optical pickup; and, FIG. 8B is a side view showing an example of the installation of the present optical pickup.
Figure 8B:
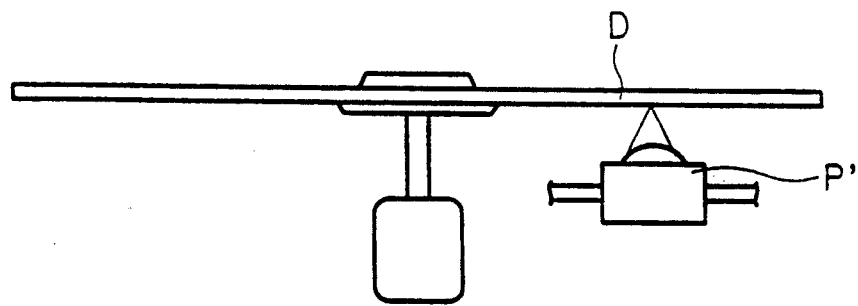

Next, FIG. 8 shows the compensation of the installations of the conventional optical pickup and the optical pickup of the present invention. In the conventional one (FIG. 8A), an actuator A is installed on the top of the pickup main body P to perform the focusing and the tracking servo control of the various parts of an optical system. The pickup main body P' according to the present invention (FIG. 8B) is a very light and simple subminiature structure, being constructed as one, self-conditioned actuator. Here, a pickup main body which includes the actuator dictates that case 1 of pickup main body P' be of a nonmagnetic material.

As described above, according to the present invention, the function of the optical system for reproducing/recording optical information can be sufficiently performed only by an aspherical single lens. Since constitution thereof is extremely simple and additional elements do not take up excessive space or weight, a very light subminiature optical pickup can be provided. Also, the manufacturing process can be marked reduced by packaging the aspherical single lens together with the other elements, and thereby enables inexpensive mass-production, especially in an optical pickup of the present invention. Since the optical axis of the light source and the objective lens (an aspherical single lens) are always matched, noise and errors are rarely generated.

The present invention is not limited to the explained embodiments, and further alternations and changes are possible within the scope of the following claims.

What is claimed is:

1. An optical pickup comprising:
   an aspherical single lens as a light focusing medium formed with a hologram reflective surface disposed on a center of a medium surface and having a predetermined hologram pattern for reflecting an incident light toward an opposite medium surface and, at the same time, focusing onto points beside the source focal point, a diffracted spherical wave from the reflected light reflected in an optical information medium;
   a reflective mirror for partially scanning a light reflected from the hologram reflective surface of said aspherical single lens via the aspherical single lens into said medium and, at the same time, reflecting said reflected light;
   a light source for providing said incident light with respect to said hologram reflective surface of the aspherical single lens; and
   a photodetector for detecting a light bounced off said hologram reflective surface of the aspherical single lens,
   thereby performing a reproducing/recording operation of optical information.

2. An optical pickup as claimed in claim 1, wherein a diffraction grating for diffracting a light of said light source is attached on the medium surface of the light source side of said aspherical single lens, and a hologram pattern of said hologram reflective surface, together with said photodetector, detect a reproducing signal and focus and track error signals from the diffracted light of said diffraction grating.

3. An optical pickup as claimed in claim 2, wherein said hologram pattern is composed of two different patterns.

4. An optical pickup as claimed in claim 2, further comprising an error detecting means for compensating for variations in both focus and track error detection due to vibration of said disc, using the peripheral light of the Gaussian beam distribution of said light source.

5. An optical pickup as claimed in claim 1, further comprising an error detecting means for compensating for variations in both focus and track error detection due to vibration of said disc, using the peripheral light of the Gaussian beam distribution of said light source.

6. An optical pickup as claimed in claim 5, wherein said error detecting means comprises at least a pair of photosensors disposed on opposite sides of said light source to detect respective parts of said reflected light.

7. An optical pickup as claimed in claim 1, wherein a cup-shaped case is provided and said aspherical single lens is attached at an upper opening of said case.

8. An optical pickup as claimed in claim 1, wherein said case is a non-magnetic material.

* * * * *

UNITED STATES PATENT AND TRADEMARK OFFICE
CERTIFICATE OF CORRECTION

PATENT NO. : 5,198,916
DATED : 30 March 1993
INVENTOR(S) : Chun-dong KIM It is certified that error appears in the above-identified patent and that said Letters Patent is hereby corrected as shown below:

Column 2, Line 46, change "is" to --are--;

Column 4, Line 53, change "have" to --has--;

Column 5, Line 22, change "are" to --is--;

Column 5, Line 44, change "marked" to --markedly--.

Signed and Sealed this

Fourth Day of January, 1994

*Attest:*

BRUCE LEHMAN

*Attesting Officer*     *Commissioner of Patents and Trademarks*